United States Patent Office 2,885,314
Patented May 5, 1959

2,885,314

MANUFACTURE OF ALUMINUM ETHYL COMPOUNDS

Horace E. Redman, Baton Rouge, La., assignor to Ethyl Corporation, New York, N.Y., a corporation of Delaware No Drawing. Application March 28, 1957
Serial No. 648,993

4 Claims. (Cl. 148—13.1)

This invention relates to the manufacture of aluminum ethyl compounds, and more specifically to the generation of these compounds by the direct reaction of aluminum metal with hydrogen and ethylene. It is particularly valuable in connection with the manufacture of triethylaluminum, $(C_2H_5)_3Al$.

This application is a continuation-in part of application Serial No. 520,899, filed July 8, 1955, now Patent No. 2,787,626, issued April 2, 1957.

Triethylaluminum has been found to be a particularly useful organometallic material having great utility in organic synthesis generally. It is for example used as a catalytic polymerization agent for the generation of straight chain polymers of ethylenically unsaturated hydrocarbons. Triethylaluminum can be generated by the reaction of ethylene with an aluminum hydride such as monethyl aluminum dihydride, diethyl aluminum hydride and aluminum trihydride. Unfortunately, the efficacy of this route is contingent upon a readily available and quite economical supply of aluminum hydride. As the manufacture of aluminum hydride customarily requires the use of a substantial excess of the expensive and relatively scarce material, lithium hydride, its use in the above described conventional procedure makes this prior process economically disadvantageous. Accordingly, the need exists for an economical process for the generation of triethylaluminum.

It is therefore an object of the present invention to provide an improved process for the preparation of triethylaluminum. Another object is to provide an economical process for the manufacture of an aluminum hydride directly from aluminum. Still other objects and advantages will become apparent from the following description and examples.

It has now been found that aluminum can be activated to react directly with hydrogen and an aluminum ethyl compound and thereby form an aluminum ethyl hydride. The aluminum metal supplied for activation is preferably in a comminuted form, e.g., as aluminum shavings prepared under nitrogen. In a specific embodiment of this invention, the process for preparing triethylaluminum comprises contacting the particulated aluminum with sufficient triethylaluminum to wet the metal surfaces and then heating the reaction zone to a temperature between about 100 and 180° C. under 5 to 50 atmospheres pressure of hydrogen. It appears that the triethylaluminum activates the metallic aluminum and undergoes a disproportionation reaction forming ethylaluminum hydrides. These hydrides can then add ethylene to form a corresponding number of moles of triethylaluminum. Although various contacting techniques are quite suitable for carrying out the process, it is preferred that the supply of aluminum shavings be initially wetted with a substantial quantity of triethylaluminum, and once having activated the metal, the reaction can be carried out to eventually form additional triethylaluminum retained in the liquid phase and hence still wetting the aluminum surface. More of the aluminum thus becomes activated and another sequence of reaction can be carried out in the same container.

In one mode of carrying out this general type of embodiment of the present invention, the aluminum is normally provided in the form of sub-divided or comminuted solids which have been prepared under an entirely inert gas atmosphere such as, for example, argon, nitrogen, or methane. From such an atmosphere, oxygen or moisture should be preferably rigorously excluded. The aluminum solid supply is inserted within a reaction zone, taking precautions to prevent the contacting of any oxygen-containing gas or moisture therewith. A quantity of triethyl-aluminum sufficient to wet at least a portion of the aluminum solids is introduced into the reaction zone and the zone is then closed off except for conduits for admitting hydrogen and ethylene-containing gases. Hydrogen-containing gas is introduced into the reaction zone and the hydrogen pressure is built up to a desired operating level which is generally super-atmospheric but below about 300 atmospheres. After attaining the desired hydrogen pressure, the contents of the reactor are heated to the necessary temperature level and maintained at that level for a period which will vary according to the refinements in the apparatus available and the reaction conditions of temperature and pressure employed, although a time of not more than about 2 to 10 hours is needed. This contacting time is ordinarily a function of the relative magnitude of the bed of sub-divided aluminum solids, the particle size of the aluminum, the pressure-temperature relationships of the reactants and the proportions of the reaction zone, e.g., the depth to superficial cross-sectional surface exposure ratio. The desired amount of pressurized ethylene is then introduced into the reaction zone to complete the reaction to the triethylaluminum.

The details of operation and the best method of carrying out the process will be illustrated by the following examples. All parts given are parts by weight.

*Example I*

About 25 parts of finely sub-divided aluminum metal is charged to an autoclave, under a dry, inert gaseous atmosphere of nitrogen. The aluminum is prepared by milling or filing in a dry nitrogen atmosphere. To this charge is added 50 parts of triethylaluminum, $(C_2H_5)_3Al$, to thoroughly wet all the particles of aluminum. The autoclave is closed, initially pressurized with 50 atmospheres of pure, dry hydrogen, and the reaction conducted at about 100° C. for 3 hours, the reactants being stirred by an externally driven agitator. The autogenous pressure of the system at the conclusion of this period depending upon the relative volume of the reaction space and the volume of the charge, will be from 100 atmospheres down to about 50 atmospheres. At the conclusion of this treatment the temperature is reduced to 60°–65° C. and an additional 100 atmospheres pressure is applied to the reaction zone by the addition of gaseous ethylene. The contacting period is continued for an additional 4 hours after which time the reaction zone temperature is reduced to 20°–25° C. and the excess pressure is released. A high conversion of aluminum to triethylaluminum is obtained.

*Example II*

To an autoclave equipped with external heating means and internal agitation was added 8 parts of atomized aluminum (Reynolds 120 aluminum powder). Then 32 parts of triethylaluminum were added and agitation was commenced whereby the aluminum particles became suspended in the triethylaluminum. The mixture was externally heated to 140° C. and maintained at this temperature for 2 hours. Hydrogen was then introduced into the autoclave to a pressure of 500 pounds per square inch gauge (p.s.i.g.), and the mixture was maintained at these conditions for 5 hours. At the end of this period the take up or, in other words, the pressure drop of hydrogen was 460 p.s.i.g., agitation was stopped along with the application of heat, and the hydrogen pressure was vented. The conversion of triethylaluminum to diethylaluminum hydride was 54.2 percent.

*Example III*

In this run the procedure and apparatus of Example II were used essentially as described with the exception that 12 parts of the aluminum and 30 parts of diethylaluminum hydride were employed for activation of the aluminum. The diethylaluminum hydride was then decanted from the aluminum particles which were kept protected by a nitrogen atmosphere. The particles were then washed with hexane to remove adhering diethyl aluminum hydride. Five parts of the so treated aluminum, still protected by nitrogen, were introduced into an autoclave and 32 parts of aluminum triethyl were added thereto. This mixture was then heated to 140° C., hydrogen was introduced to a pressure of 1,000 p.s.i.g., and agitation commenced. These conditions were maintained for 3⅔ hours. The take up of hydrogen was 930 p.s.i.g.

The preliminary cook of the luminum with the aluminum ethyl compound shortens the time for the reaction with the hydrogen. This shortening is quite pronounced when the preliminary cook is carried out at the higher temperatures in the specified range. The hydrogen does not have to be present during the preliminary cook in order to effect the shortening. If it is present however, it will react forming ethyl aluminum hydrides which produce a greater activation of the aluminum and for this reason the presence of hydrogen is preferred. The rate of reaction with the hydrogen is generally not the same as the rate of activation and there will usually be unreacted activated aluminum present.

The activation can be carried out with any aluminum ethyl compound in which the ethyl is directly linked to the aluminum and any aluminum valences not linked to an ethyl are linked to hydrogen. Triethylaluminum, diethylaluminum hydride and monoethyl aluminum dihydride are compounds of the above type.

Where the activating treatment is carried out with a compound which is not desired to react with the aluminum, hydrogen is excluded from the activation step and as in Example III, the activated aluminum is separated from the balance of the activating mixture. Inert solvents such as saturated hydrocarbons can be present in the activating reaction and/or the subsequent steps in the formation of the triethylaluminum, but it is not preferred.

The gaseous pressures employed in the reaction with hydrogen is preferably between about 5 and 50 atmospheres, whether or not the activation is conducted during this reaction. Inert gases such as nitrogen can be employed in addition to the hydrogen in order to pressurize the reaction zone to a desired value while employing minimal quantities of hydrogen. When hydrogenation is not carried out with the activation, the vapor space in the reactor is generally occupied by such inert gases.

The activating step is usually effective if carried out for as little as 15 minutes although longer times are preferred and as long as 2 hours may be used to obtain maximum benefits. At the higher temperatures the full 2 hours is generally not needed.

This step can be carried out in either a batch or continuous operation. In most cases, continuous processing is desired for obvious economic reasons. In any event, the correlation of time-temperature-pressure noted above is generally maintained in either operation.

In a particularly desirable form the present invention is carried out in such a manner that a single reactor is used, the aluminum and other reactants being introduced in their proper sequence, and the aluminum triethyl recovered after all the reaction steps are completed. A large excess of aluminum, about ten times the amount that would react with the activating compound, can in this way be loaded initially, followed by activation and reaction with hydrogen to form the ethyl aluminum hydride. It should be noted that such formation creates additional amounts of activating compound and more of the aluminum becomes activated as this part of the reaction proceeds. The original proportion of aluminum is such that there generally is enough activating compound to adequately wet the entire mass. Ethylene can now be added to the reaction mixture to cause the ethyl aluminum hydride to be converted to triethylaluminum. This further increases the volume of activating liquid so that more of the aluminum becomes activated and an additional step of reacting with hydrogen can then be carried out followed by separate ethylene addition steps until all the aluminum is exhausted.

The volume of activating liquid may be increased by the addition of inert diluent as explained above, but this does not result in as much activation and also slows down all the reaction steps including that with hydrogen as well as with ethylene. It is accordingly preferred to operate with less than 5% solvent in the activating liquid. It is to be understood however, that some activation of the aluminum is obtained when as little as 5% and less of the activator in the diluent is employed. In this instance, activated aluminum can be used for other purposes or the volume of diluent can be reduced to below about 5% and the activated aluminum used in the process of this invention.

The reaction of the ethylene with the ethylaluminum hydrides need not be carried out at temperatures as high as those given for the activation or the reaction with hydrogen. In general, a temperature range of from 30 to 130° C. is suitable, using ethylene pressures of from 1 to about 100 atmospheres. About 0.5 or less to 3 to 6 hours give suitable reaction times. Generally, reaction times longer than 20 hours are not required.

Obviously many modifications and variations of the present invention are possible in the light of the above teachings. It is, therefore, to be understood that within the scope of the appended claims the invention may be practiced otherwise than as specifically described.

What is claimed is:

1. A process of activating aluminum for the purpose of preparing aluminum ethyl compounds, the process being characterized by heating a mixture consisting essentially of aluminum and an aluminum ethyl compound in which the ethyl is directly linked to the aluminum and any aluminum valences not linked to an ethyl are linked to hydrogen, the heating being at a temperature of from about 100 to 140° C. for a time sufficient to render the aluminum active.

2. The process of claim 1 in which the aluminum ethyl compound is aluminum triethyl.

3. The process of claim 1 in which the aluminum ethyl compound is diethyl aluminum hydride.

4. The process of claim 3 in which the contacted materials are exposed to a hydrogen atmosphere during the heating.

References Cited in the file of this patent

UNITED STATES PATENTS

| | | |
|---|---|---|
| 2,691,668 | Ziegler et al. | Oct. 12, 1954 |
| 2,787,626 | Redman | Apr. 2, 1957 |

Notice of Adverse Decision in Interference

In Interference No. 91,614 involving Patent No. 2,885,314, H. E. Redman, Manufacture of aluminum ethyl compounds, final judgment adverse to the patentee was rendered Oct. 2, 1962, as to claims 1, 2, 3 and 4.

[*Official Gazette November 6, 1962.*]